United States Patent
Feng et al.

(10) Patent No.: US 12,299,896 B1
(45) Date of Patent: May 13, 2025

(54) SYNTHETIC IMAGE GENERATION BY MANIFOLD MODIFICATION OF A MACHINE LEARNING MODEL

(71) Applicant: Amazon Technologies, Inc., Seattle, WA (US)

(72) Inventors: Qianli Feng, Seattle, WA (US); Raghu Deep Gadde, Bothell, WA (US); Pietro Perona, Altadena, CA (US); Aleix Margarit Martinez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 17/702,202

(22) Filed: Mar. 23, 2022

(51) Int. Cl.
*G06T 3/14* (2024.01)
*G06N 3/045* (2023.01)
*G06T 7/187* (2017.01)
*G06V 10/74* (2022.01)
*G06V 10/774* (2022.01)

(52) U.S. Cl.
CPC .............. *G06T 7/187* (2017.01); *G06N 3/045* (2023.01); *G06V 10/761* (2022.01); *G06V 10/7747* (2022.01); *G06T 2207/20084* (2013.01)

(58) Field of Classification Search
CPC .......... G06T 7/187; G06T 2207/20084; G06N 3/045; G06V 10/761; G06V 10/7747
See application file for complete search history.

(56) References Cited

U.S. PATENT DOCUMENTS

| | | | |
|---|---|---|---|
| 2021/0038198 A1* | 2/2021 | Jacob | G06F 18/2135 |
| 2021/0319302 A1* | 10/2021 | Li | G06N 3/084 |
| 2022/0122305 A1* | 4/2022 | Smith | G06T 11/001 |
| 2022/0414451 A1* | 12/2022 | Gurev | G06N 3/094 |
| 2023/0289608 A1* | 9/2023 | Zhong | G06N 3/045 |

OTHER PUBLICATIONS

Abal, R. et al., "Image2StyleGAN: How to Embed Images Into the StyleGAN Latent Space?", 2019 IEEE/CVF International Conference on Computer Vision (ICCV), pp. 4431-4440, 2019.
Abal, R. et al., "Image2StyleGAN++: How to Edit the Embedded Images?", CVPR, pp. 8293-8302, 2020.
Adelson, E.H et al., "Pyramid methods in image processing", RCA engineer, 29(6):33-41, 1984.

(Continued)

*Primary Examiner* — Iriana Cruz
(74) *Attorney, Agent, or Firm* — Kilpatrick Townsend & Stockton LLP

(57) ABSTRACT

Described herein is a computer-implemented method for generating a synthetic image. An input image can be received by a computing device. A representation of the input image on an image approximation manifold can be identified by inputting the input image into a machine learning model. The image approximation manifold can be defined by the machine learning model. A local region of the image approximation manifold can be modified relative to the first representation to generate a modified image approximation manifold. The modified image approximation manifold can include a second representation of the input image. A synthetic image can be generated based on the modified image approximation manifold. A rendering of the synthetic image can be caused on a display.

20 Claims, 8 Drawing Sheets

(56) References Cited

OTHER PUBLICATIONS

Alaluf, Y. et al., "ReStyle: A Residual-Based StyleGAN Encoder via Iterative Refinement", In Proceedings of the IEEE/CVF International Conference on Computer Vision (ICCV), Oct. 2021.

Balakrishnan, G. et al., "Towards causal benchmarking of bias in face analysis algorithms", arXiv e-prints, pp. arXiv-2007, 2020.

Bau, D et al., "Seeing What a GAN Cannot Generate", ICCV, pp. 4501-4510, 2019.

Beery, S. et al., "Recognition in Terra Incognita", In Proceedings of the European conference on computer vision (ECCV), pp. 456-473, 2018.

Bojanowski, P. et al., "Optimizing the Latent Space of Generative Networks", In International Conference on Machine Learning, pp. 600-609. PMLR, 2018.

Brock, A. et al., "Large Scale Gan Training for High Fidelity Natural Image Synthesis", In International Conference on Learning Representations, 35 pages, 2018.

Chai, L. et al., "Using Latent Space Regression To Analyze and Leverage Compositionality in Gans", ICLR, 30 pages, Jun. 3, 2021.

Chai, L. et al., "Ensembling with Deep Generative Views", In CVPR, 24 pages, Apr. 29, 2021.

Choi, Y. et al., "StarGAN v2: Diverse Image Synthesis for Multiple Domains", In Proceedings of the IEEE/CVF Conference on Computer Vision and Pattern Recognition, pp. 8188-8197, 2020.

Creswell, A. et al., "Inverting The Generator Of A Generative Adversarial Network", IEEE Transactions on Neural Networks and Learning Systems, 30:1967-1974, 2019.

Raghudeep, G. et al., "Detail Me More: Improving GAN's photorealism of complex scenes", In Proceedings of the IEEE/CVF International Conference on Computer Vision (ICCV), pp. 13950-13959, Oct. 2021.

Seo Jo, E. et al., "Lessons from Archives: Strategies for Collecting Sociocultural Data in Machine Learning", In Proceedings of the 2020 Conference on Fairness, Accountability, and Transparency, pp. 306-316, 2020.

Kang, K. et al., "GAN Inversion for Out-of-Range Images with Geometric Transformations", ICCV, 9 pahges, Aug. 20, 2021.

Karras, T. et al., "Progressive Growing of GANs for Improved Quality, Stability, and Variation", In International Conference on Learning Representations, 26 pages, 2018.

Karras, T. et al., "Alias-Free Generative Adversarial Networks", In Proc. NeurIPS, 31 pages, Oct. 18, 2021.

Karras, T. et al., "A Style-Based Generator Architecture for Generative Adversarial Networks", arXiv:1812.04948 [cs.NE], 12 pages, Mar. 29, 2019.

Karras, T. et al., "A Style-Based Generator Architecture for Generative Adversarial Networks", Proceedings of the IEEE conference on computer vision and pattern recognition, pp. 4401-4410, 2019.

Karras, T. et al., "Analyzing and Improving the Image Quality of StyleGAN", In Proc. CVPR, 21 pages, Mar. 23, 2020.

Karras, T. et al., "Analyzing and Improving the Image Quality of StyleGAN", In Proceedings of the IEEE/CVF Conference on Computer Vision and Pattern Recognition, pp. 8110-8119, 2020.

Krause, J. et al., "3D Object Representations for Fine-Grained Categorization", 2013 IEEE International Conference on Computer Vision Workshops, pp. 554-561, 2013.

Lipton, Z.C. et al., "Precise Recovery of Latent Vectors From Generative Adversarial Networks", ArXiv, abs/1702.04782, 4 pages, 2017.

Menon, S. et al., "PULSE: Self-Supervised Photo Upsampling via Latent Space Exploration of Generative Models", In Proceedings of the IEEE/CVF conference on computer vision and pattern recognition, pp. 2437-2445, 2020.

Pidhorskyi, S. et al., "Adversarial Latent Autoencoders", In Proceedings of the IEEE/CVF Conference on Computer Vision and Pattern Recognition, pp. 14104-14113, 2020.

Raji, D.I. et al., " Actionable Auditing: Investigating the Impact of Publicly Naming Biased Performance Results of Commercial AI Products", In Proceedings of the 2019 AAAI/ACM Conference on AI, Ethics, and Society, pp. 429-435, 2019.

Richardson, E. et al., "Encoding in Style: a StyleGAN Encoder for Image-to-Image Translation", CVPR, 21 pages, Apr. 21, 2021.

Shen, Y. et al., "InterFaceGAN: Interpreting the Disentangled Face Representation Learned by GANs", IEEE transactions on pattern analysis and machine intelligence, 16 pages, 2020.

Shen, Y. et al., "Closed-Form Factorization of Latent Semantics in GANs", In CVPR, 9 pages, Apr. 3, 2021.

Simonyan, K. et al., "Very Deep Convolutional Networks for Large-Scale Image Recognition", In International Conference on Learning Representations, 14 pages, Apr. 10, 2015.

Torralba, A. et al., "Unbiased Look at Dataset Bias", In CVPR 2011, pp. 1521-1528. IEEE, 2011.

Tzelepis, C. et al., "WarpedGANSpace: Finding non-linear RBF paths in GAN latent space", In Proceedings of the IEEE/CVF International Conference on Computer Vision (ICCV), pp. 6393-6402, Oct. 2021.

Wang, T. et al., "High-Fidelity GAN Inversion for Image Attribute Editing", arxiv:2109.06590, 22 pages, Sep. 15, 2021.

Wu, Z. et al., "StyleSpace Analysis: Disentangled Controls for StyleGAN Image Generation", In Proceedings of the IEEE/CVF Conference on Computer Vision and Pattern Recognition, pp. 12863-12872, 2021.

Xia, W. et al., "GAN Inversion: A Survey", arXiv preprint arXiv:2101.05278, 21 pages, Aug. 13, 2021.

Yu, F. et al., "LSUN: Construction of a Large-Scale Image Dataset using Deep Learning with Humans in the Loop", arXiv preprint arXiv:1506.03365,, 9 pages, Jun. 4, 2016.

Zhang, R. et al., "The Unreasonable Effectiveness of Deep Features as a Perceptual Metric", In Proceedings of the IEEE conference on computer vision and pattern recognition, pp. 586-595, 2018.

Zhu, Jun-Yan et al., "Generative Visual Manipulation on the Natural Image Manifold", arXiv:1609.03552 [cs. CV], 16 pages, Dec. 16, 2018.

\* cited by examiner

SYNTHETIC IMAGE GENERATION BY MANIFOLD MODIFICATION OF A MACHINE LEARNING MODEL

BACKGROUND

Machine learning models can be trained to perform various tasks. For example, machine learning models can learn to perform classification, segmentation, and image generation tasks. Images generated by a machine learning model may be capable of being edited to change attributes of the image.

BRIEF DESCRIPTION OF THE DRAWINGS

Various embodiments in accordance with the present disclosure will be described with reference to the drawings, in which.

DETAILED DESCRIPTION

Figure 1:
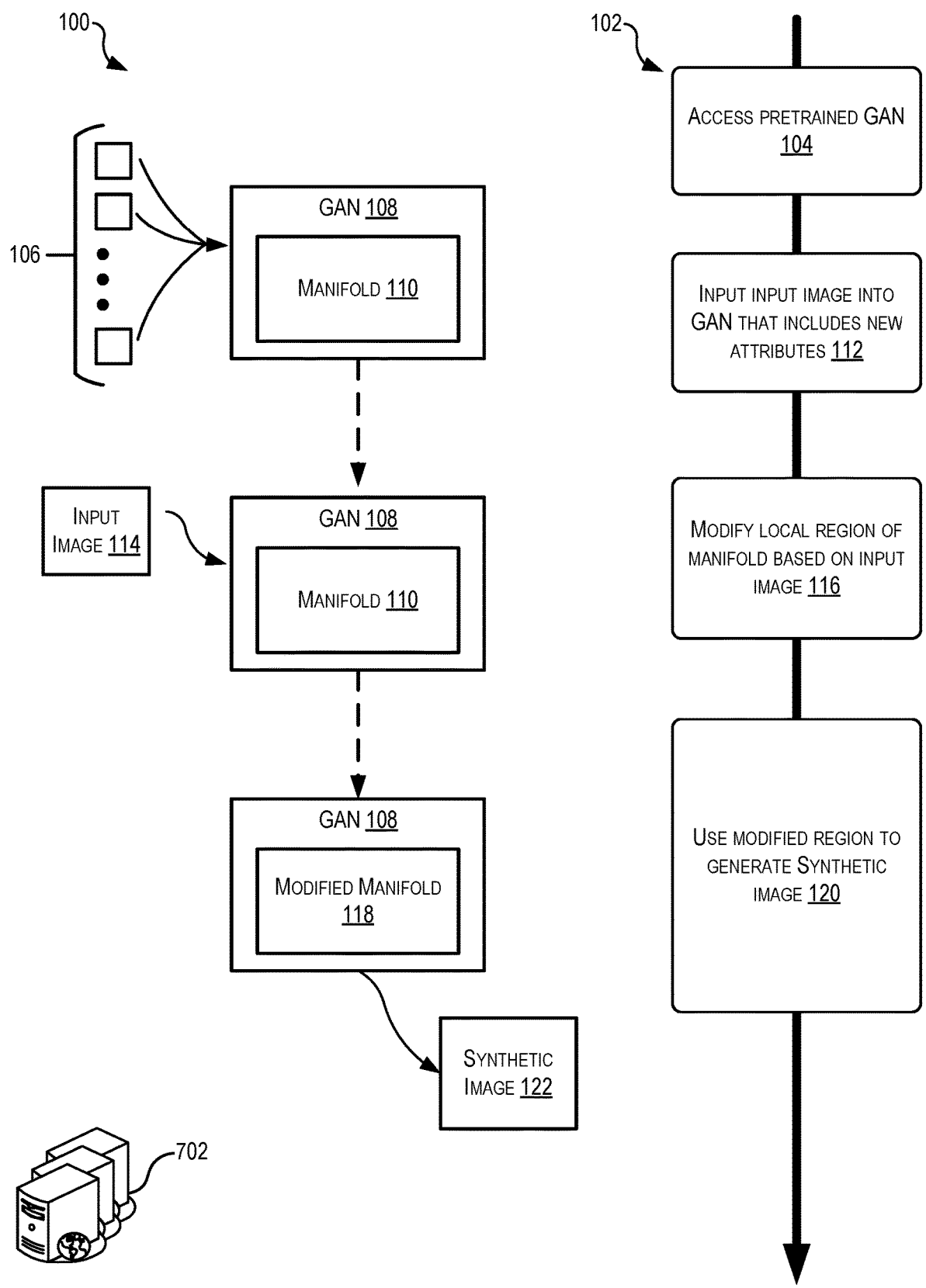
FIG. 1 illustrates an example block diagram and associated flowchart showing a process for implementing techniques relating to generating synthetic images by modifying a manifold, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, various techniques for generating synthetic images by modifying a manifold defined by a machine learning model. A computing device can perform operations relating to generating a synthetic image that is visually similar to a received input image by using one or more machine-learning models or techniques. In an example, the computing device can use a pre-trained generative adversarial network (GAN). The input image may be input to the machine learning model, which can determine a representation of the input image on an image manifold that corresponds to a latent vector of the input image. The image manifold can be defined by the machine-learning model. The computing device can adjust the image manifold so that a region of the image manifold that is local to the representation more closely corresponds to the input image. An adjusted image manifold, resulting from locally adjusting the image manifold, can include a second representation associated with a synthetic image. The computing device can generate the synthetic image based on the modified image manifold and provide the synthetic image for presentation at a display. In an example, the computing device may additionally modify attributes of the synthetic image.

In a particular example, a computing device, such as a webserver, a personal computing device, a tablet computer, a smartphone, or the like, can receive an input image. The input image can include a set of input image attributes, such as attributes associated with the input image including a woman with long brown hair that is smiling. The computing device can input the input image to a GAN generator, which can identify a first representation of the input image on an image approximation manifold. The first representation may correspond to a synthetic image of a woman with long brown hair and a neutral facial expression. So, the computing device can modify a local region of the image approximation manifold so that a second representation of the input image on a modified image approximation manifold more closely matches the input image. The computing device can evaluate a first loss function associated with similarity between the input image and the second representation, and a second loss function associated with global cohesion of the image approximation manifold to generate the modified image approximation manifold. The computing device can generate a synthetic image based on the modified image approximation manifold. The synthetic image can be visually identical, or indistinguishable by the naked eye, to the input image, so the synthetic image can include a woman with long brown hair that is smiling. This may be used to modify faces to experimentally test facial recognition algorithms to help root out bias. For example, various synthetic images of different faces can be generated and used to test facial recognition algorithms. In addition, synthetic images may be generated and displayed on a website so that variations of an object or space can be visualized without a user taking images of the variations. Also, access to the algorithm may be provided to a user as a service so that the user can provide input images and receive synthetic images for their own tasks.

Turning now to the figures, FIG. 1 illustrates an example block diagram 100 and associated flowchart showing a process 102 for implementing techniques relating to generating synthetic images by modifying a manifold, according to at least one example.

The diagram 100 depicts devices, objects, and the like that correspond to the process 102. The process 102 can be performed by any suitable combination of hardware and/or software, as described herein.

Figure 5:
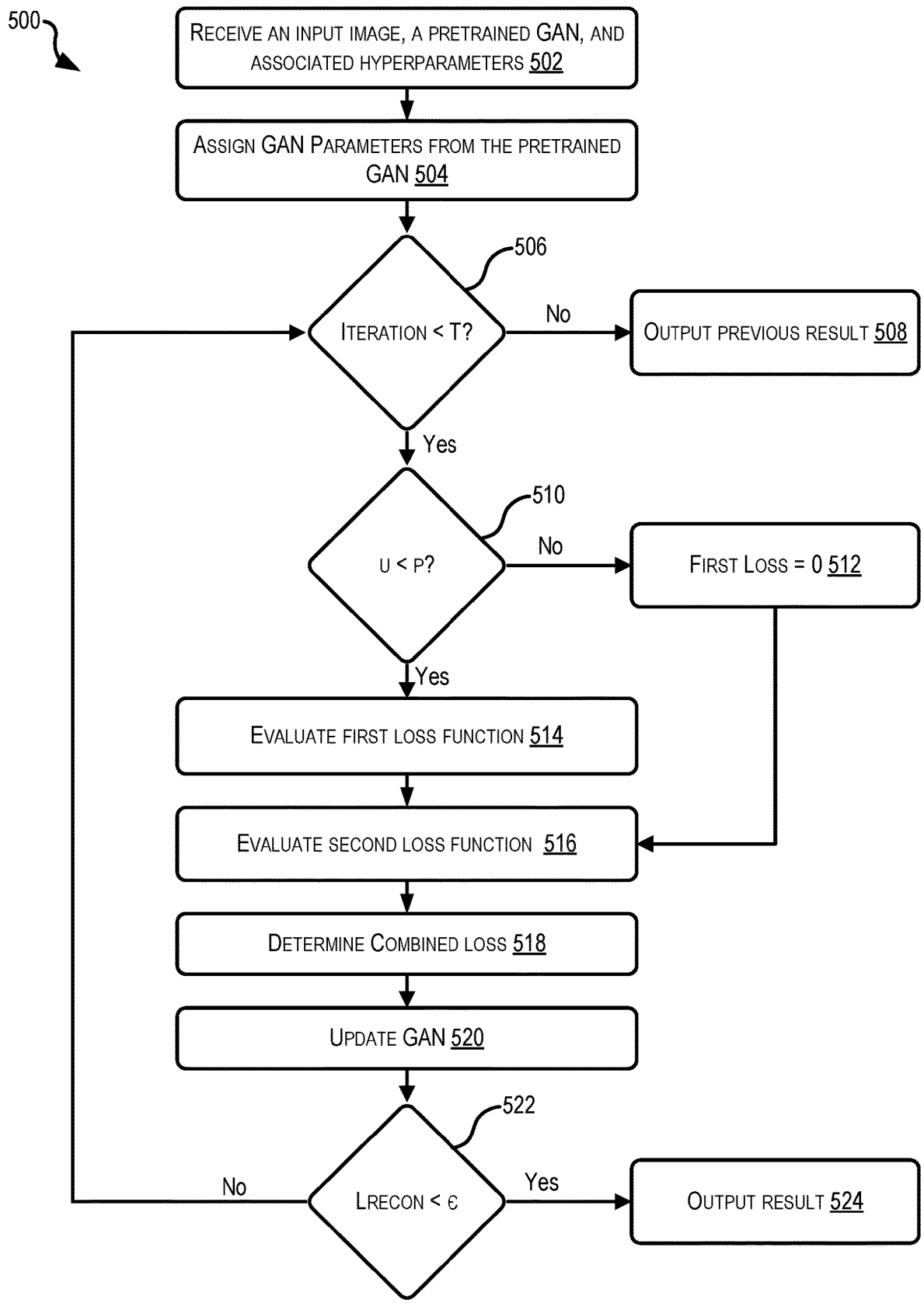
FIG. 5 illustrates an example flowchart showing a process for implementing techniques relating to applying an algorithm to modify a manifold defined by a machine learning model, according to at least one example.
Figure 6:
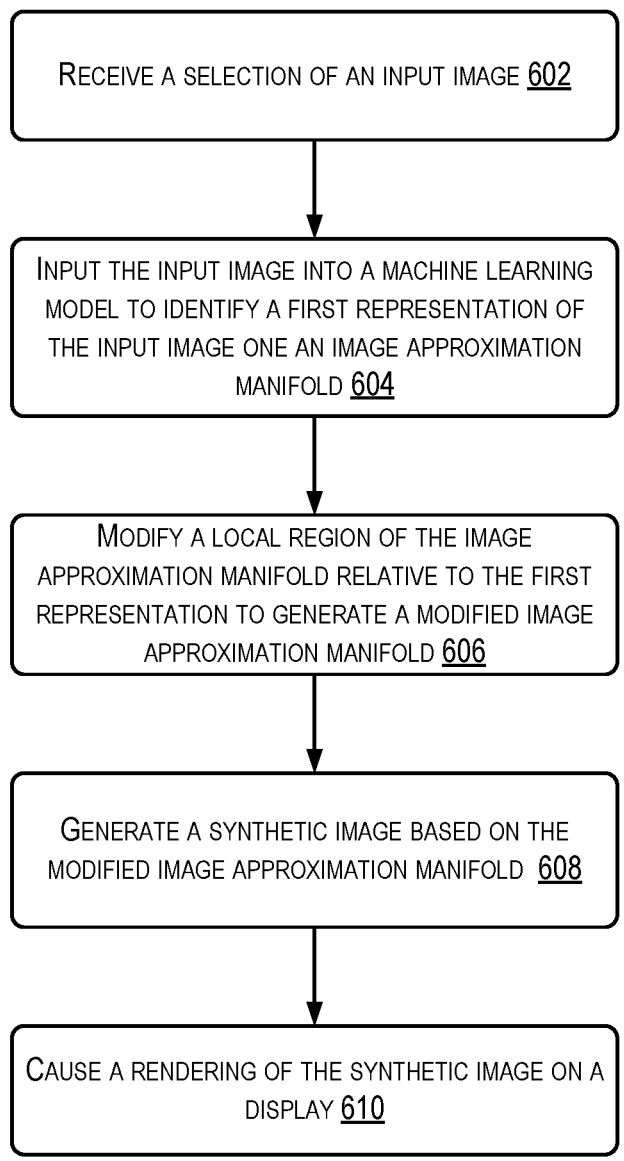
FIG. 6 illustrates an example flowchart showing a process for implementing techniques relating to generating synthetic images by modifying a manifold, according to at least one example.

FIGS. 1, 5, and 6 illustrate example flow diagrams showing respective processes 102, 500, and 600, as described herein. The processes 102, 500, and 600, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A synthetic image engine 710 (FIG. 7) embodied in a computer system 702 (FIG. 7) and/or within a user device 704 (FIG. 7) may perform the process 102. Thus, while the description below is from the perspective of the computer system 702, the user device 704 may also perform the process 102 or portions of the process 102.

The process 102 may being at block 104 by the computer system 702 accessing a pretrained GAN 108. The GAN 108 may be configured to generate synthetic images from input images. The GAN 108 can be trained using training images 106 that each include attributes. For example, the training images 106 may be images of faces that have varying attributes of hair styles, hair colors, eye gazes, facial expressions, glasses, etc. The training images 106 may additionally include images of other objects with varying attributes. The GAN 108 can be trained to learn a manifold 110, which is an image manifold. Each location on the manifold 110 represents a particular location in a latent space, and locations on the manifold 110 that are closer together are considered to be more similar than locations that are farther apart. For example, images of faces with glasses may be represented by locations on the manifold 110 that are closer together than images of faces without glasses.

The process 102 may continue at block 112 by the computer system 702 inputting an input image 114 into the GAN 108. The input image 114 can include one or more attributes that the training images 106 did not include. For example, the input image 114 can be an image of a face with an angry facial expression, and none of the training images 106 may include a face having an angry facial expression. The computer system 702 can identify a representation of the input image 114 on the manifold 110. The representation of the input image 114 can be a latent vector that represents the input image 114 and constitutes a first mapping between a latent space and the representation on the manifold 110.

The process 102 may continue at block 116 by the computer system 702 modifying a local region of the manifold 110 based on the input image 114. The local region can be a region of the manifold 110 that is relative to the representation of the input image 114. The local region can be determined during training to be as small or as large as needed to accomplish the task. So, the local region may be any region of the manifold 110 that is less than an entirety of the manifold 110. The local region may be modified to represent a context of the input image 114. For example, the local region may be modified based on the attributes of the input image 114. The modification of the manifold 110 can generate a modified manifold 118 that includes a second representation of the input image 114. The second representation can represent a synthetic image and constitute a second mapping between the latent space and the second representation on the modified manifold 118. The second representation of the input image 114 can be a closer approximation of the input image 114 than the representation on the manifold 110. Modifying the local region of the manifold 110 to generate the modified manifold 118 may involve evaluating a first loss function associated with similarity between the input image 114 and the second representation. So, the second representation can correspond to a representation on the modified manifold 118 that minimizes the difference between the first representation of the input image 114 and the second representation of the input image 114. Additionally, generating the modified manifold 118 may involve evaluating a second loss function associated with global cohesion of the manifold 110. The second loss function can ensure that a portion of the manifold 110 that is not relative to the representation of the input image 114 is not changed.

The process 102 may continue at block 120 by the computer system 702 using the modified manifold 118 to generate a synthetic image 122. The synthetic image 122 can be generated based on the modified manifold 118. That is, the second representation on the modified manifold 118 can correspond to a latent vector that represents the synthetic image 122. Based on the latent vector, the computer system 702 can generate the synthetic image 122, which may be visually identical to the input image 114. That is, any differences between the synthetic image 122 and the input image 114 may be small enough that they are not detectable by the naked eye. The synthetic image 122 includes a set of synthetic image attributes that correspond to the attributes of the input image 114. In some examples, the synthetic image 122 may be editable to remove a synthetic image attribute of the set of synthetic image attributes, or to add a different image attribute not previously included in either the image attributes or the set of synthetic image attributes. Additionally, the synthetic image 122 may correspond to a portion of the input image 114, for instance, if the input image 114 is cropped prior to the GAN 108 receiving the input image 114. As an example, the computer system 702 can detect and crop facial regions in the input image 114, align and pre-process the cropped facial regions according to properties of the training images 106, invert and edit the aligned faces with the GAN 108 to generate the synthetic image 122, and replace the original face regions of the input image 114 with the edited face regions of the synthetic image 122.

Figure 2:
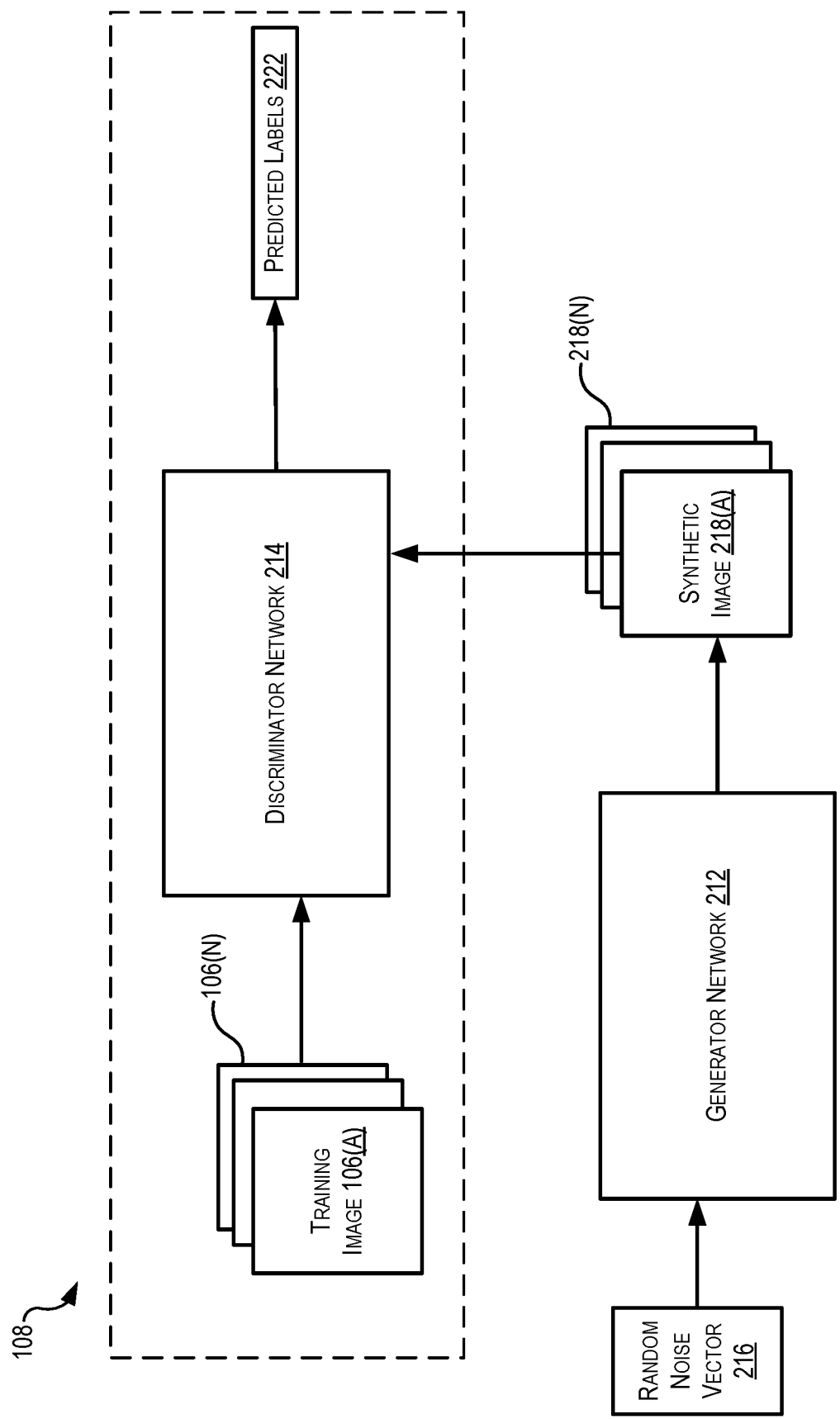
FIG. 2 illustrates an example block diagram showing a generative adversarial network, according to at least one example.

FIG. 2 illustrates an example block diagram showing an architecture of a GAN 108, according to at least one example. The GAN 108 can include two neural networks that compete with each other to maximize the accuracy of generating a synthetic image from an input image. In an example, the GAN 108 includes a generator network (G(·)) 212 and a discriminator network (D(·)) 214. During training, as indicated with the dashed box, the generator network 212 can generate synthetic images 218, while the discriminator network 214 determines whether the synthetic images 218 are real or fake images. The generator network 212 can generate the synthetic images 218 from a random noise vector (z) 216. The random noise vector 216 can be sampled from a normal or uniform distribution. The random noise vector 216 can be a latent vector of a latent space, which is a lower dimensional space than the image space. For example, the random noise vector 216 can represent latent features (e.g., color, shape, etc.) of a synthetic image. Each dimension of the latent vector can represent a different latent feature, which can correspond to attributes of images.

The discriminator network 214 can compare the synthetic images 218 to training images 106, which are real images, to determine whether the synthetic images 218 are real or fake images. The discriminator network 214 can output predicted labels 222 indicating whether each of the synthetic images 218 are predicted to be real or fake. The predicted labels 222 may be binary labels, with a zero representing a fake image and a one representing a real image. Alternatively, the predicted labels 222 may be probabilities of a likelihood of the synthetic images 218 being real images. The discriminator network 214 can provide feedback of the predicted labels 222 to the generator network 212 so that the generator network 212 can learn which features correspond to features in the training images 106.

As the generator network 212 learns to accurately generate synthetic images, the generator network 212 can also learn a manifold that represents attributes of the training images 106. Locations in the latent space can be mapped to locations on the manifold, so that each training image 106 is associated with a location on the manifold and a corresponding location in the latent space. The synthetic images 218 generated by the generator network 212 also each correspond to a location on the manifold. Each location can correspond to a representation of an image. Since the manifold can only capture features of images that are present in the training images 106, the synthetic images 218 may only be able to include attributes included in the training images 106.

In conventional approaches, to edit real images, a synthetic image corresponding to the real image is first generated. A GAN inversion algorithm can be used to generate the synthetic image. GAN inversion involves determining a latent vector (z) for an input image (x), such that when passed through the generator network 212, the generator network 212 generates a synthetic image close to the input image. The generator function $G(z)=x$ maps a latent vector $z \in Z \subseteq \mathbb{R}^q$ into an image $x \in X \subseteq \mathbb{R}^p$, with $q \ll p$, and p being a hyperparameter of $G(\cdot)$. GAN inversion involves finding z given x. That is, $z=G^{-1}(x)$. To solve this problem, an encoder or optimization approach may be used to solve:

$$\min \|G(h(x))-x\| \quad (1)$$

with the algorithm converging to a solution iff $\|G(h(x))-x\| < \in$, and where $\|\cdot\|$ is a metric in image space X, $h: X \mapsto Z$, e is a hyperparameter of $G(\cdot)$, and $\in > 0$ is small.

Optimization algorithms find the latent vector representation of a given image by optimizing $h(\cdot)$ as in Eq. (1) from a starting guess. In encoder approaches $h(\cdot)$ can be a deep network trained to map from X onto Z and optimize Eq. (1) over a training set. Optimization and encoder approaches may assume that the mapping $G(\cdot)$ is able to synthesize the desirable image x. However, given the large variety of all possible photos X, this assumption typically does not hold, resulting in sub-par reconstruction results. While optimization- and encoder-based approaches optimize or learn $h(\cdot)$ while fixing $G(\cdot)$, it may be possible to fix $h(\cdot)$ and locally tune $G(\cdot)$ instead, as further described in FIG. 3.

Figure 3:
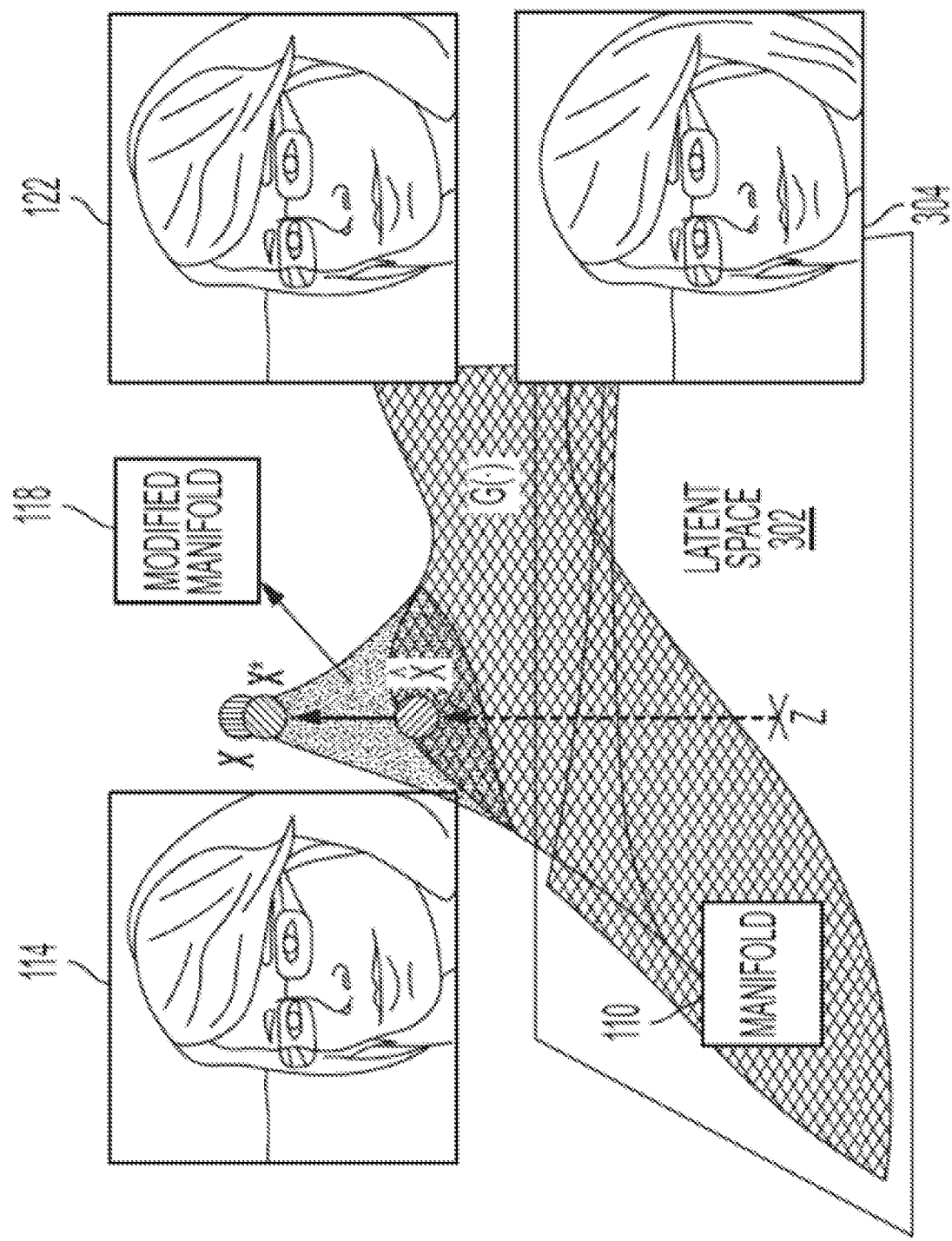
FIG. 3 illustrates an example schematic showing a manifold, a modified manifold, and associated images, according to at least one example.

FIG. 3 illustrates an example schematic showing a manifold 110, a modified manifold 118, and associated images, according to at least one example. For a given input image $x \in X$, corresponding to input image 114, it is desirable to obtain its corresponding latent vector z E Z in latent space 302 that reconstructs x, the input image 114, as accurately as possible. That is, $G(z)=x^*$, with $\|x^*-x\| < \in$, and where $x^*$ is synthetic image 122. To reconstruct x, previous methods operate under the assumption that $x^*$ is on the manifold 110 defined by $G(\cdot)$. That is, $z \in Z$ so that $G(z)=x^*$. But, when x does not lie on or very close to the pre-trained manifold 110 defined by $G(\cdot)$, the best these methods can do is to retrieve its nearest projection $\hat{x}$. The nearest projection $\hat{x}$ is illustrated as intermediate image 304 in FIG. 3, which shows an example where the input image 114 is not on the manifold 110 defined by $G(\cdot)$. Thus, conventional GAN inversion methods can at best synthesize the intermediate image 304, which is the image on the manifold 110 defined by $G(\cdot)$ that is closest to x, the input image 114. Here, closeness is given by an orthographic projection onto the manifold 110. For example, the input image 114 includes a woman wearing a hood of jacket on her head, but the intermediate image 304 includes a woman that is not wearing a hood. This is likely because $G(\cdot)$ was not trained with images that included a person wearing a hood, so $G(\cdot)$ cannot accurately produce an image with a person wearing a hood.

Aspects of the present disclosure relate to generating a modified manifold 118 from the manifold 118 to accurately generate synthetic image 122. The manifold 110 defined by $G(\cdot)$ cannot be modified in any random way that happens to include x. This is because in addition to including x for the input image 114, the manifold 110 should only change locally and in a way that allows edits to be made to the synthetic image 122. In addition, the edits should yield synthetic image variants that look as realistic as the input image 114.

To successfully adjust the manifold 110 locally, the intermediate image 304, or x, which is the closest representation of x on the manifold 110, is determined. To determine x, any conventional GAN inversion may be used. That is, $h(\cdot)$ can be optimized by keeping $G(\cdot)$ fixed. Once $\hat{x}$ is obtained, $h(\cdot)$ can be fixed to let $G(\cdot)$ change locally about $\hat{x}$ to include $x^*$.

It may be desirable to make the smallest change possible while maintaining the desirable properties of a pre-trained $G(\cdot)$ so that the synthetic image 122 corresponding to $x^*$ can be edited in a number of controllable ways. To do this, two loss functions may be combined. A first loss function $\mathcal{L}_{local}$ can locally tweak the manifold 110 to include x by making the distance from x to $x^*$ as small as possible and keeping the properties of the manifold 110 intact. The second loss function $\mathcal{L}_{global}$ can ensure global cohesion of the rest of the manifold 110.

The first loss function can include two components: a reconstruction loss function $\mathcal{L}_{recon}$ and an adversarial loss function Lady local. In general, for the manifold 110 defined by $G(\cdot)$ to generate x, there is a latent vector z so that $G(z)$ is as similar to x as possible, which can be computed using a reconstruction loss function $\mathcal{L}_{recon}(x_1; x_2)$ that measures the similarity between $x_1$ and $x_2$, with $x_i \in X$.

Since the goal is to synthesize an image that is as visually similar to the input image 114 as possible, a Laplacian pyramid loss function can be used as $\mathcal{L}_{recon}$. Note, however, that other similarity losses could be used. For example, a Euclidean distance function or a L1 norm function may alternatively be used.

Let $\mathcal{L}_{recon}$=Laplacian Pyramid (x; G(z)) be the reconstruction loss computed using the Laplacian pyramid, which is calculated by summing over mean L1 differences across all levels of a Laplacian pyramid of x and G(z). The latent vector z can be found so that $G(z)=x$. $\mathcal{L}_{recon}$ can then be optimized until $\mathcal{L}_{recon} < \in$.

To encourage that the modified manifold 118 is editable and maintains all other desirable properties, the reconstruction loss function is regularized with an adversarial loss function, $\mathcal{L}_{adv\_local}$. Specifically, $\mathcal{L}_{adv\_local}=\log D(x)=\log(1-D(G(z)))$, where $D(\cdot)$ is a discriminator network.

The combined $\mathcal{L}_{local}$ can be expressed as:

$$\mathcal{L}_{local}=\mathcal{L}_{recon}+\lambda\mathcal{L}_{adv\_local} \quad (2)$$

where $\lambda$ is the regularizing term and is a hyperparameter. Here too, z can be found so that G(z)=x and then $\mathcal{L}_{local}$ can be optimized.

The second loss function can ensure that the rest of the manifold 110 does not change. The loss of the pre-trained GAN can be used. For example, when using StyleGAN2, the global loss can be expressed as:

$$\mathcal{L}_{global}=\mathbb{E}_{x\sim p_x}[\log D(x)]+\mathbb{E}_{z\sim p_z}[\log(1-D(G(z)))] \quad (3)$$

where x, z, $p_x$ and $p_z$ are defined as in the pretrained GAN.

Combining the local loss function and the global loss function, the final loss function to optimize the modified manifold 118 can be expressed as:

$$\mathcal{L}=1_p[\mathcal{L}_{local}]+\mathcal{L}_{global} \quad (4)$$

where $1_p$ is an indicator function activated with probability p, with p generally kept small to attain good convergence and stability on $G(\cdot)$. The lower the p, the less frequently the $\mathcal{L}_{local}$ term updates during training. For example, when p=⅛, $\mathcal{L}_{local}$ can be updated once for every eight updates on £global.

Once the loss functions are optimized, the updated generator $G^+$, defining the modified manifold 118, can be used to generate and edit the synthetic image 122. As shown in FIG. 3, the synthetic image 122 includes a woman wearing a hood, which is a more accurate representation of the input image 114 than the intermediate image 304. Editing techniques that do not involve training (e.g., StyleSpace) can be directly applied on $G^+$. Methods that do involve model training (e.g., WarpedGANSpace, Image2StyleGAN) can also be directly applied without re-training on $G^+$, since $G^+$ preserves most manifold structure as the pre-trained generator.

Figure 4:
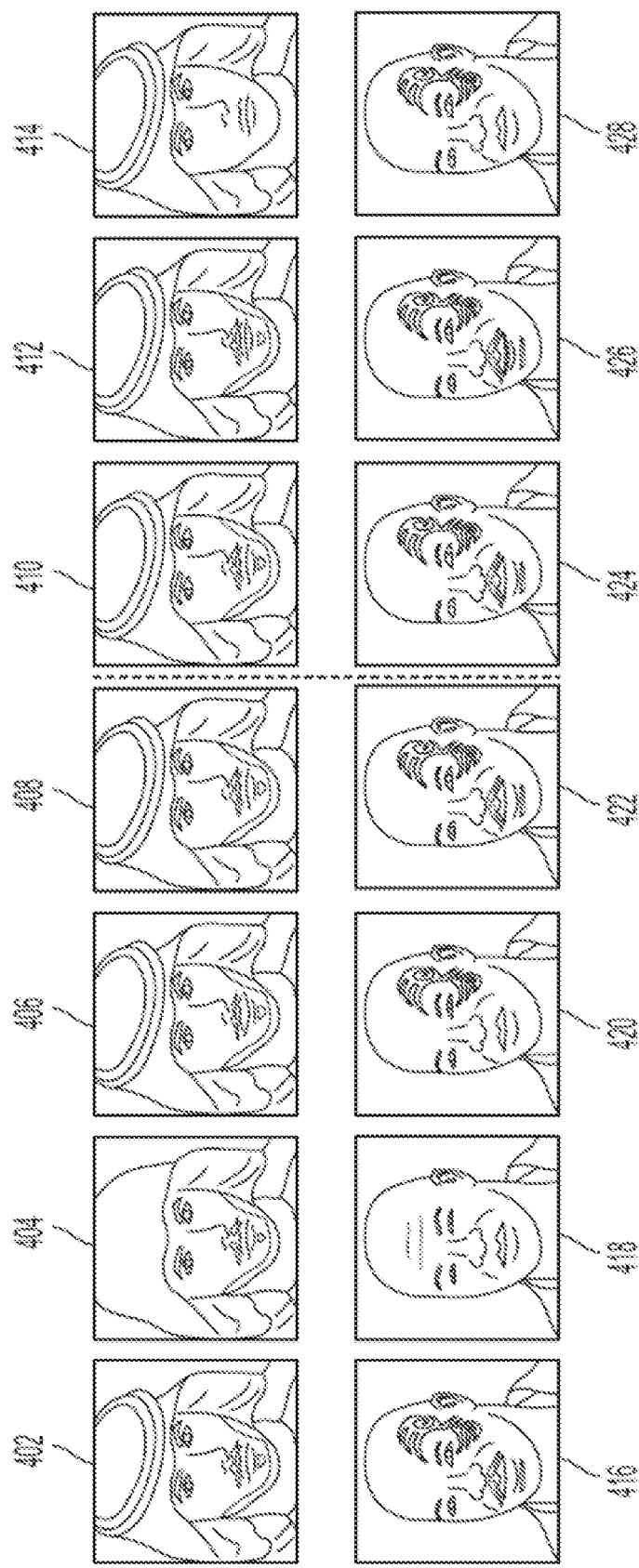
FIG. 4 illustrates exemplary results of generating and modifying synthetic images using different techniques, according to at least one example.

FIG. 4 illustrates exemplary results of generating and modifying synthetic images using different techniques, according to at least one example. Images 402 and 416 represent input images that conventional GAN inversion algorithms and a GAN manifold modification technique as described herein seek to reproduce, as illustrated with synthetic images 404-408 and 418-422. Synthetic images 404 and 406 correspond to images generated by two different conventional GAN inversion algorithms, and synthetic images 408 and 422 correspond to images generated by the GAN manifold modification technique described herein. Synthetic images 404, 406, 418, and 420 each include noticeable differences compared to input images 402 and 416. For instance, the hijab in synthetic image 404 is blurry and not recognizable as a hijab. Additionally, the facial hair and facial expression of the face in the synthetic image 420 are different from the facial hair and facial expression of the face in the corresponding input image 416. But, synthetic image 408 is visually identical to input image 402 and synthetic image 422 is visually identical to input image 416. So, the GAN manifold modification technique that is described herein produces more accurate synthetic images compared to the conventional GAN inversion algorithms.

FIG. 4 also includes modified synthetic images 410-414 and 424-428 that illustrate modifications that can be performed to the synthetic images 408 and 422 by standard GAN editing algorithms. Modified synthetic images 410 and 424 have an altered eye gaze from that of the synthetic images 408 and 422 (and the input images 402 and 416). Additionally, modified synthetic images 412 and 426 have an altered mouth shape from that of the synthetic images 408 and 422 (and the input images 402 and 416). In addition, modified synthetic images 414 and 428 have different facial hair from that of the synthetic images 408 and 422 (and the input images 402 and 416). The results of the modified synthetic images 410-414 and 424-428 indicate the capability for attributes of the synthetic images 408 and 422, generated by the GAN manifold modification technique that is described herein, to be accurately modified.

FIG. 5 illustrates an example flowchart showing a process 500 for implementing techniques relating to applying an algorithm to modify a manifold defined by a machine learning model, according to at least one example. The image generation and modification engine 710 (FIG. 7) embodied in the computer system 702 (FIG. 7) and/or within the user device 704 (FIG. 7) may perform the process 500. Thus, while the description below is from the perspective of the computer system 702, the user device 704 may also perform the process 500 or portions of the process 500.

The process 500 may begin at block 502 by the computer system 702 receiving an input image x, a pretrained GAN and associated hyperparameters. The pretrained GAN can include a generator network $G(\cdot)$ and a discriminator network $D(\cdot)$. The pretrained GAN can define a manifold. The hyperparameters can include values for p, $\in$, and $\lambda$, as described in FIG. 3. The computer system 702 may also receive an inversion function $h(\cdot)$ and a number of iterations "T" for the algorithm.

The process 500 may continue at block 504 by the computer system 702 assigning GAN parameters from a pretrained GAN. The generator network $G(\cdot)$ and the discriminator network $D(\cdot)$ can be assigned GAN parameters. Additionally, the h(x) can be set to z, which corresponds to a latent vector of the input image.

The process 500 may continue at block 506 by the computer system 702 making a determination of whether a current iteration is less than the number of iterations "T". In an example, the number of iterations may be fifty, and the current iteration may be the first iteration, so the computer system 702 determines that the current iteration is less than "T".

If during the determination at block 506, the computer system 702 determines that the current iteration is not less than the number of iterations "T", then the process 500 may continue at block 508 by the computer system 702 outputting a previous result. The previous result can be an updated generator network from a previous iteration. The updated generator network may define an updated manifold that can be used to generate a synthetic image that is visually similar to the input image.

The process 500 may continue at block 510 by the computer system 702 making a determination of whether u is less than p. u is approximately the uniform distribution from zero to 1. The computer system 702 can compare u to the hyperparameter p to determine whether u is less than p. A first loss function may only be updated every few iterations, compared to a second loss function that can be updated during each iteration. For example, when p=½, the first loss function can be updated once for every two updates on the second loss function. Values of u can correspond with the current iteration, so that when u is less than p, the first loss function can be updated.

If during the determination at block 510, the computer system 702 determines that u is not less than p, then the process 500 may continue at block 512 by the computer system 702 setting a first loss function to zero. The first loss function can be a local loss function that is associated with a similarity between the input image and a representation of the input image generated by the generator network. In some examples, the first loss function may be dependent on a reconstruction loss function, and an adversarial loss function.

The process 500 may continue at block 514 by the computer system 702 evaluating the first loss function. The first loss function can be the loss function of Eq. (2).

The process 500 may continue at block 516 by the computer system 702 evaluating a second loss function. The second loss function can be associated with global cohesion of the manifold defined by the generator network. The second loss function can be the loss function of Eq. (3).

The process 500 may continue at block 518 by the computer system 702 determining a combined loss. The combined loss can be calculated using Eq. (3), which combines the first loss function and the second loss function.

The process 500 may continue at block 520 by the computer system 702 updating the GAN. The computer system 702 can update the generator network G(·) and the discriminator network D(·) with gradients from the combined loss. For example, $G^{(t+1)}$ can be updated with $$\frac{\partial \mathcal{L}}{\partial G^t},$$

and $D^{(t+1)}$ can be updated with $$\frac{\partial \mathcal{L}}{\partial D^t},$$

where t is the current iteration.

The process 500 may continue at block 522 by the computer system 702 making a determination of whether the reconstruction loss is less than ∈. The computer system 702 can compare the reconstruction loss to the hyperparameter p to determine whether the reconstruction loss is less than ∈.

If during the determination at block 522, the computer system 702 determines that the reconstruction loss is less than E, then the process 500 may continue at block 524 by the computer system 702 outputting a result. The result can include the updated GAN $G^+(·)$, which is set to be $G^{(t+1)}(·)$. From $G^+(·)$, a synthetic image x* corresponding to the input image can be generated.

If during the determination at block 522, the computer system 702 determines that the reconstruction loss is not less than ∈, then the process 500 may continue by the computer system returning to block 506 and proceeding until either the current iteration exceeds "T" or the reconstruction loss becomes less than E.

FIG. 6 illustrates an example flowchart showing a process 600 for implementing techniques relating to generating synthetic images by modifying a manifold, according to at least one example. The image generation and modification engine 710 (FIG. 7) embodied in the computer system 702 (FIG. 7) and/or within the user device 704 (FIG. 7) may perform the process 600. Thus, while the description below is from the perspective of the computer system 702, the user device 704 may also perform the process 600 or portions of the process 600.

The process 600 may begin at block 602 by the computer system 702 receiving a selection of an input image 114 (FIG. 1). The input image 114 can include a plurality of attributes corresponding to a set of input image attributes.

The process 600 may continue at block 604 by the computer system 702 inputting the input image 114 into a machine learning model (e.g., GAN 108 in FIG. 1) to identify a first representation of the input image 114 on an image approximation manifold (e.g., manifold 110 in FIG. 1). In some examples, the machine learning model can be a GAN generator. The image approximation manifold can be defined by the GAN generator. In some examples, the first representation may be a first latent vector that represents the input image 114 and constitutes a first mapping between a latent space 302 (FIG. 3) and the first representation on the image approximation manifold. In some examples, the machine learning model may be trained using a corpus of images. At least some attributes of the plurality of attributes may not present in any images of the corpus of images. In some examples, the input image may not be represented by the image approximation manifold.

The process 600 may continue at block 606 by the computer system 702 modifying a local region of the image approximation manifold relative to the first representation to generate a modified image approximation manifold (e.g., modified manifold 118 in FIG. 1). The local region may be modified to represent a context of the input image. In some examples, modifying the local region of the image approximation manifold can involve evaluating a loss function (e.g., as described as Eq. (4)) that is dependent on the machine learning model. The loss function can include a first loss function (e.g., as described as Eq. (2)) associated with similarity between the input image 114 and a second representation of the input image 114, and a second loss function (e.g., as described as Eq. (3)) associated with global cohesion of the image approximation manifold. In some examples, the first loss function may be dependent on a reconstruction loss function and an adversarial loss function. The reconstruction loss function can account for visual differences between a synthetic image 122 (FIG. 1) and the input image 114, and the adversarial loss function can account for a synthetic image 122 being editable.

The process 600 may continue at block 608 by the computer system 702 generating a synthetic image 122 based on a second representation on the modified image approximation manifold. The modified image approximation manifold can include the second representation of the input image 114. In some examples, the second representation can represent the synthetic image 122 and constitute a second mapping between the latent space 302 and the second representation on the modified image approximation manifold. In some examples, the input image 114 and the synthetic image 122 may be visually identical. The synthetic image 122 can include a set of synthetic image attributes that correspond to the set of input image attributes.

The process 600 may continue at block 610 by the computer system 702 causing a rendering of the synthetic image 122 on a display. In some examples, the synthetic image 122 may be editable using GAN editing algorithms. The synthetic image 122 may be modified by removing a synthetic image attribute of the set of synthetic image attributes, or by adding a different image attribute not previously included in either the set of input image attributes or the set of synthetic image attributes. In some examples, modifying the synthetic image 122 may involve adjusting a latent vector that corresponds to the second representation.

Figure 7:
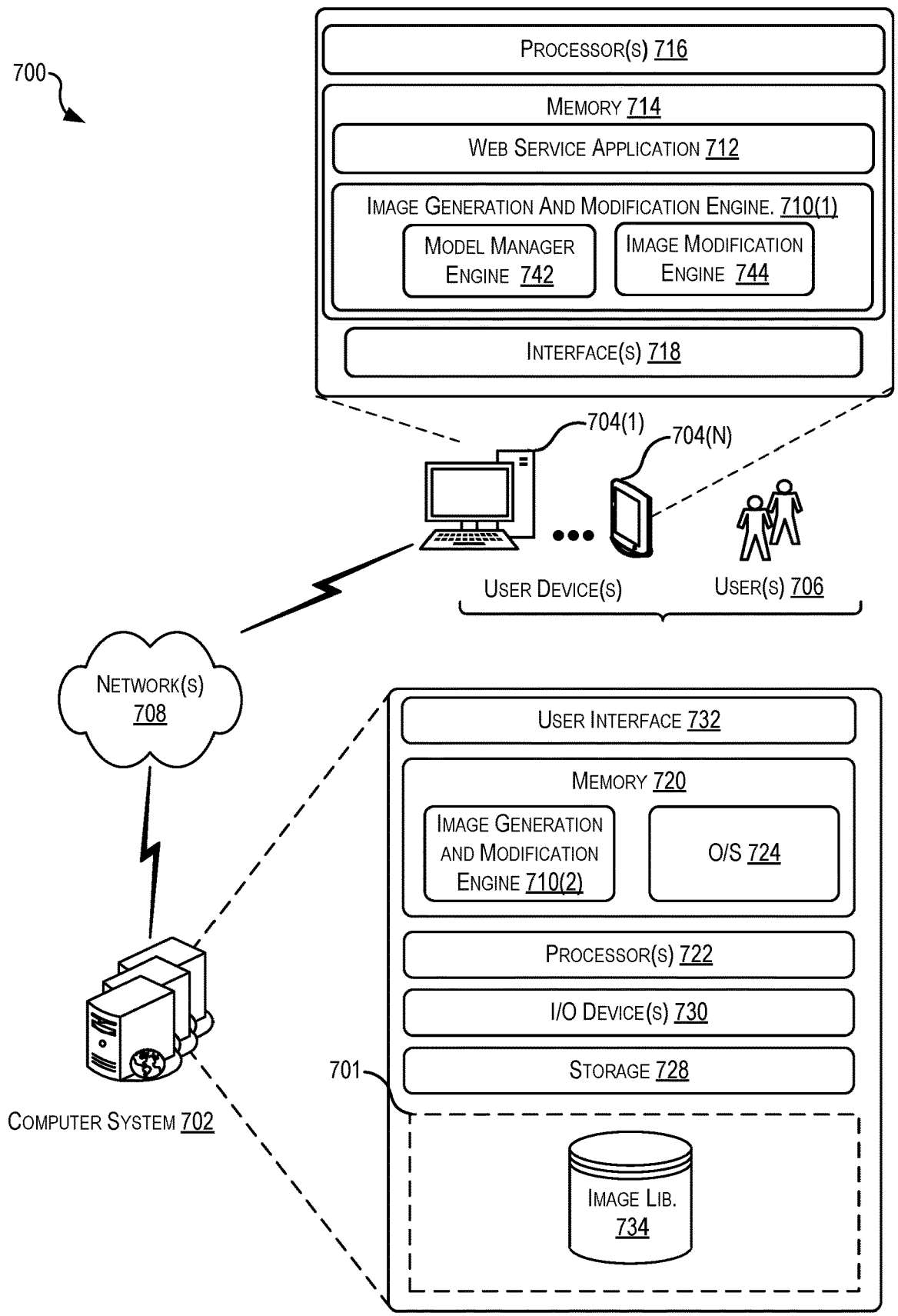
FIG. 7 illustrates an example schematic architecture for implementing techniques relating to generating synthetic images by modifying a manifold, according to at least one example.

FIG. 7 illustrates an example schematic architecture 700 for implementing techniques relating to generating synthetic images by modifying a manifold, according to at least one example. The architecture 700 may include a computer system 702 (e.g., the computer system described herein) in communication with one or more user devices 704(1)-704 (N) via one or more networks 708 (hereinafter, "the network 708").

The user device 704 may be operable by one or more users 706 to interact with the computer system 702. The users 706 may be administrators, developers, or others that desire to test or utilize operations of the techniques described herein. The user device 704 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 704(1) is illustrated as a desktop computer, while the user device 704(N) is illustrated as an example of a handheld mobile device.

The user device 704 may include a memory 714 and processor(s) 716. In the memory 714 may be stored program instructions that are loadable and executable on the processor(s) 716, as well as data generated during the execution of these programs. Depending on the configuration and type of user device 704, the memory 714 may be volatile (such as random access memory ("RAM")) and/or non-volatile (such as read-only memory (ROM), flash memory, etc.).

In some examples, the memory 714 may include a web service application 712 and a version of an image generation and modification engine 710 (e.g., 710(1)). The web service application 712 and/or the an image generation and modification engine 710(1) may allow the user 706 to interact with the computer system 702 via the network 708. The user device 704 may also include one or more interfaces 718 to enable communication with other devices, systems, and the like. The image generation and modification engine 710, whether embodied in the user device 704 or the computer system 702, may be configured to perform the techniques described herein.

The image generation and modification engine 710 includes a model manager engine 742 and an image modification engine 744. In an example, the image generation and modification engine 710 can include any other suitable engines, modules, models, and the like.

The model manager engine 742 can include one or more machine-learning (or artificial intelligence) models. In an example, the model manager engine 742 may include one or more GANs, or other suitable amounts or types of machine-learning models. The model manager engine 742 can manage various tasks related to the machine-learning model. In an example, the model manager engine 742 may train the machine-learning model, may ingest data into the machine-learning model, may transmit or otherwise share output from the machine-learning model, and any other suitable tasks. In an example, the model manager engine 742 may be the machine-learning model, may take the machine-learning input, and may output the machine-learning output relating to a synthetic image. The machine-learning model of the model manager engine 742 may be configured to generate representations of input images, modify image approximation manifolds to generate second representations that correspond to the input images, generate synthetic images based on the second representations, and/or perform other suitable machine-learning tasks with respect to the input images described herein.

The image modification engine 744 can include one or more computer services for modifying a synthetic image generated by the model manager engine 742. In an example, the image modification engine 744 may include one or more GAN editing algorithms. The image modification engine 744 may ingest synthetic images, may apply modifications to the synthetic images, may transmit or otherwise share the modified synthetic images, and any other suitable tasks.

Turning now to the details of the computer system 702, the computer system 702 may include one or more computer system computers, perhaps arranged in a cluster of servers or as a server farm, and may host web service applications. The function of the computer system 702 may be implemented a cloud-based environment such that individual components of the computer system 702 are virtual resources in a distributed environment.

The computer system 702 may include at least one memory 720 and one or more processing units (or processor(s)) 722. The processor 722 may be implemented as appropriate in hardware, computer-executable instructions, software, firmware, or combinations thereof. Computer-executable instruction, software, or firmware implementations of the processor 722 may include computer-executable or machine-executable instructions written in any suitable programming language to perform the various functions described. The memory 720 may include more than one memory and may be distributed throughout the computer system 702. The memory 720 may store program instructions that are loadable and executable on the processor(s) 722, as well as data generated during the execution of these programs. Depending on the configuration and type of memory including the computer system 702, the memory 720 may be volatile (such as RAM and/or non-volatile (such as read-only memory ("ROM"), flash memory, or other memory)). The memory 720 may include an operating system 724 and one or more application programs, modules, or services for implementing the features disclosed herein including at least a version of the image generation and modification engine 710 (e.g., 710(2)). For example, the image generation and modification engine 710(2) may perform the functionality described herein.

The computer system 702 may also include additional storage 728, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 728, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 702 and/or part of the user device 704.

The computer system 702 may also include input/output (I/O) device(s) and/or ports 730, such as for enabling connection with a keyboard, a mouse, a pen, a voice input device, a touch input device, a display, speakers, a printer, or other I/O device.

In some examples, the computer system 702 may also include one or more user interface(s) 732. The user interface 732 may be utilized by an operator, curator, or other authorized user to access portions of the computer system 702. In some examples, the user interface 732 may include a graphical user interface, voice interfaces, web-based applications, programmatic interfaces such as APIs, or other user interface configurations.

The computer system 702 may also include a data store 701. In some examples, the data store 701 may include one or more databases, data structures, or the like for storing and/or retaining information associated with the computer system 702 and which, in some examples, may be accessible by the user devices 704. The image generation and modification engine 710 is communicatively coupled (e.g., via a wired connection or a wireless connection) to the data store 701. The data store 701 includes an image library 234. In an example, the data store 701 can include any other suitable data, databases, libraries, and the like.

Figure 8:
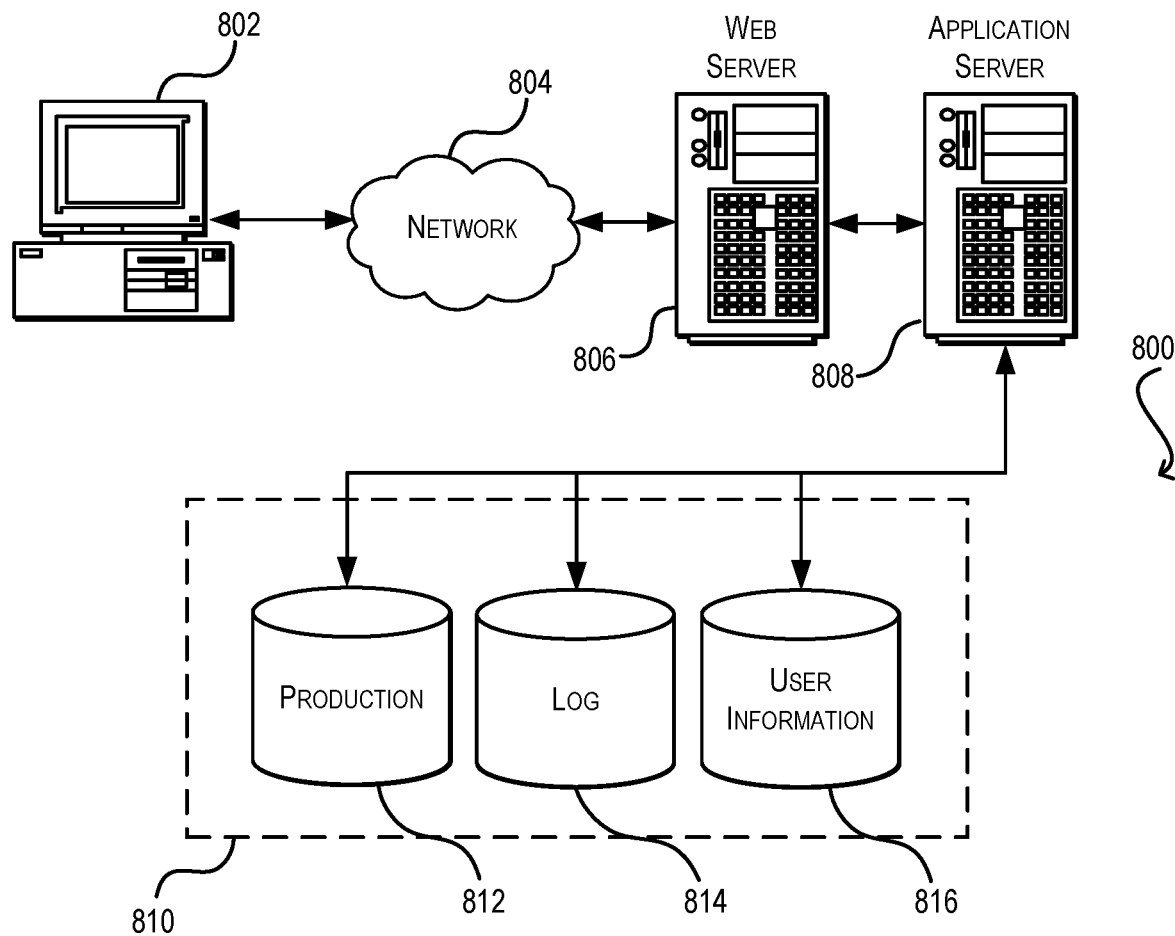
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle R, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more processors of a computer system, cause the computer system to perform operations comprising:
    receiving a selection of an input image;
    inputting the input image into a generative adversarial network (GAN) generator to identify a first representation of the input image on an image approximation manifold, the image approximation manifold being defined by the GAN generator;
    modifying a local region of the image approximation manifold relative to the first representation to generate a modified image approximation manifold, the modified image approximation manifold comprising a second representation of the input image, wherein modifying the local region of the image approximation manifold comprises:
        evaluating a first loss function associated with similarity between the input image and the second representation;
        evaluating a second loss function associated with global cohesion of the image approximation manifold;
    generating a synthetic image based on the modified image approximation manifold; and
    causing rendering of the synthetic image on a display.

2. The one or more non-transitory computer-readable media of claim 1, wherein the first representation comprises a first latent vector that represents the input image and constitutes a first mapping between a latent space and the first representation on the image approximation manifold.

3. The one or more non-transitory computer-readable media of claim 2, wherein the second representation represents the synthetic image and constitutes a second mapping between the latent space and the second representation on the modified image approximation manifold.

4. The one or more non-transitory computer-readable media of claim 1, wherein the input image comprises a set of input image attributes and the synthetic image comprises a set of synthetic image attributes that correspond to the set of input image attributes.

5. The one or more non-transitory computer-readable media of claim 4, further comprising additional computer-executable instructions that, when executed by the one or more processors of the computer system, cause the computer system to perform additional operations comprising modifying the synthetic image by removing a synthetic image attribute of the set of synthetic image attributes, or by adding a different image attribute not previously included in either the set of input image attributes or the set of synthetic image attributes.

6. A computer-implemented method, comprising:
    receiving a selection of an input image;
    inputting the input image into a machine learning model to identify a first representation of the input image on an image approximation manifold, the image approximation manifold being defined by the machine learning model;
    modifying a local region of the image approximation manifold relative to the first representation to generate a modified image approximation manifold, the modified image approximation manifold comprising a second representation of the input image;
    generating a synthetic image based on the modified image approximation manifold; and
    causing rendering of the synthetic image on a display.

7. The computer-implemented method of claim 6, wherein modifying the local region of the image approximation manifold comprises evaluating a loss function that is dependent on the machine learning model.

8. The computer-implemented method of claim 7, wherein the loss function comprises a first loss function associated with similarity between the input image and the second representation, and a second loss function associated with global cohesion of the image approximation manifold.

9. The computer-implemented method of claim 8, wherein the first loss function is dependent on a reconstruction loss function, and an adversarial loss function.

10. The computer-implemented method of claim 9, wherein the reconstruction loss function accounts for visual differences between the synthetic image and the input image, and the adversarial loss function accounts for the synthetic image being editable.

11. The computer-implemented method of claim 6, wherein the input image and the synthetic image are visually identical.

12. The computer-implemented method of claim 6, further comprising modifying the synthetic image to include an image attribute that was not in the input image.

13. The computer-implemented method of claim 12, wherein modifying the synthetic image comprises adjusting a latent vector that corresponds to the second representation.

14. The computer-implemented method of claim 6, wherein the local region is modified to represent a context of the input image.

15. The computer-implemented method of claim 6, wherein the machine learning model comprises a generative adversarial network (GAN) generator.

16. The computer-implemented method of claim 6, wherein the synthetic image is editable using generative adversarial network (GAN) editing algorithms.

17. The computer-implemented method of claim 6, wherein the first representation corresponds to an intermediate image closest to the input image on the image approximation manifold, wherein the second representation is closer to the input image in latent space than the intermediate image, and wherein modifying the image approximation manifold comprises:
- evaluating a first loss function associated with similarity between the input image and the second representation, wherein the first loss function is dependent on a reconstruction loss function and an adversarial loss function; and
- evaluating a second loss function associated with global cohesion of the image approximation manifold.

18. A system, comprising:
- one or more memories configured to store computer-executable instructions;
- one or more processors configured to access the one or more memories and execute the computer-executable instructions to at least:
  - receive a selection of an input image;
  - input the input image into a machine learning model to identify a first representation of the input image on an image approximation manifold, the image approximation manifold being defined by the machine learning model;
  - modify a local region of the image approximation manifold relative to the first representation to generate a modified image approximation manifold, the modified image approximation manifold comprising a second representation of the input image;
  - generate a synthetic image based on the modified image approximation manifold; and
  - cause rendering of the synthetic image on a display.

19. The system of claim 18, wherein modifying the local region of the image approximation manifold comprises evaluating a loss function that is dependent on the machine learning model.

20. The system of claim 19, wherein the loss function comprises a first loss function associated with similarity between the input image and the second representation, and a second loss function associated with global cohesion of the image approximation manifold.

* * * * *